Figure 1:
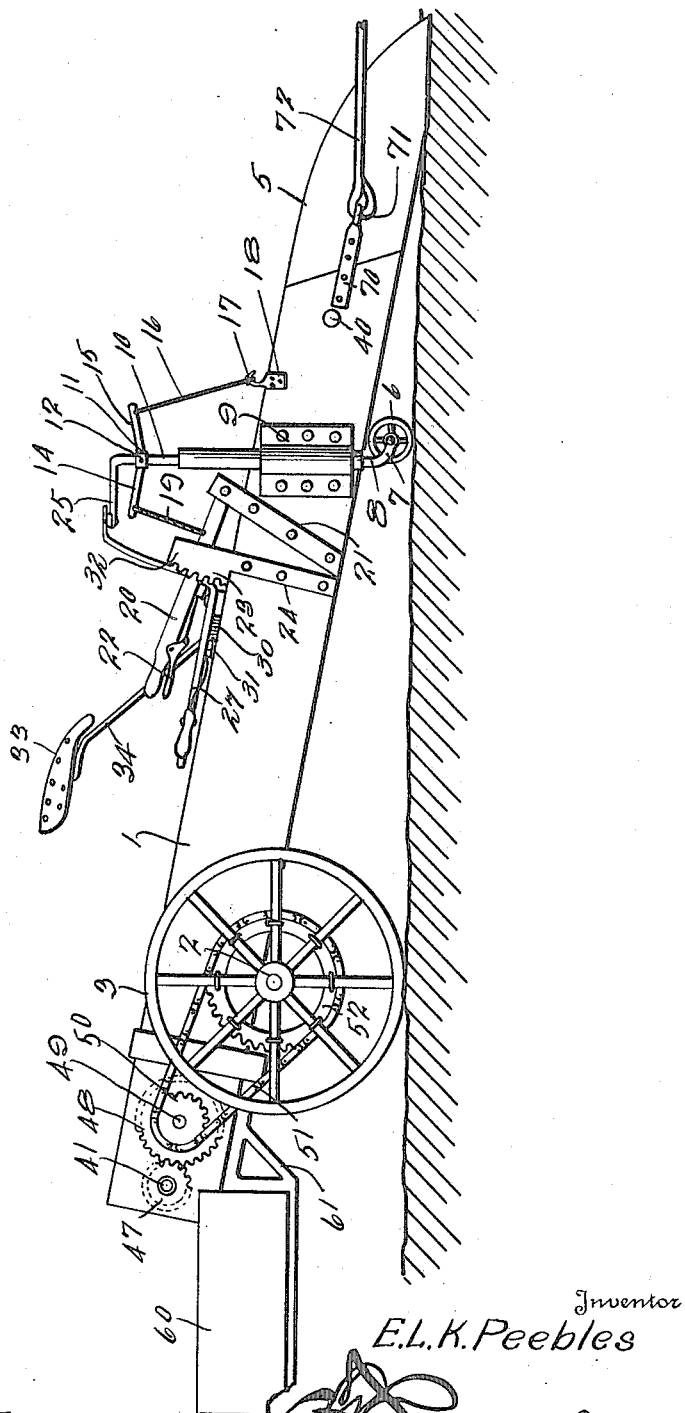

E. L. K. PEEBLES.
BEET HARVESTER.
APPLICATION FILED APR. 7, 1915.

1,169,673.

Patented Jan. 25, 1916.
2 SHEETS—SHEET 1.

Witnesses
Chas. H. Trotter
Rob't Meyer

Inventor
E. L. K. Peebles
By [signature]
Attorney

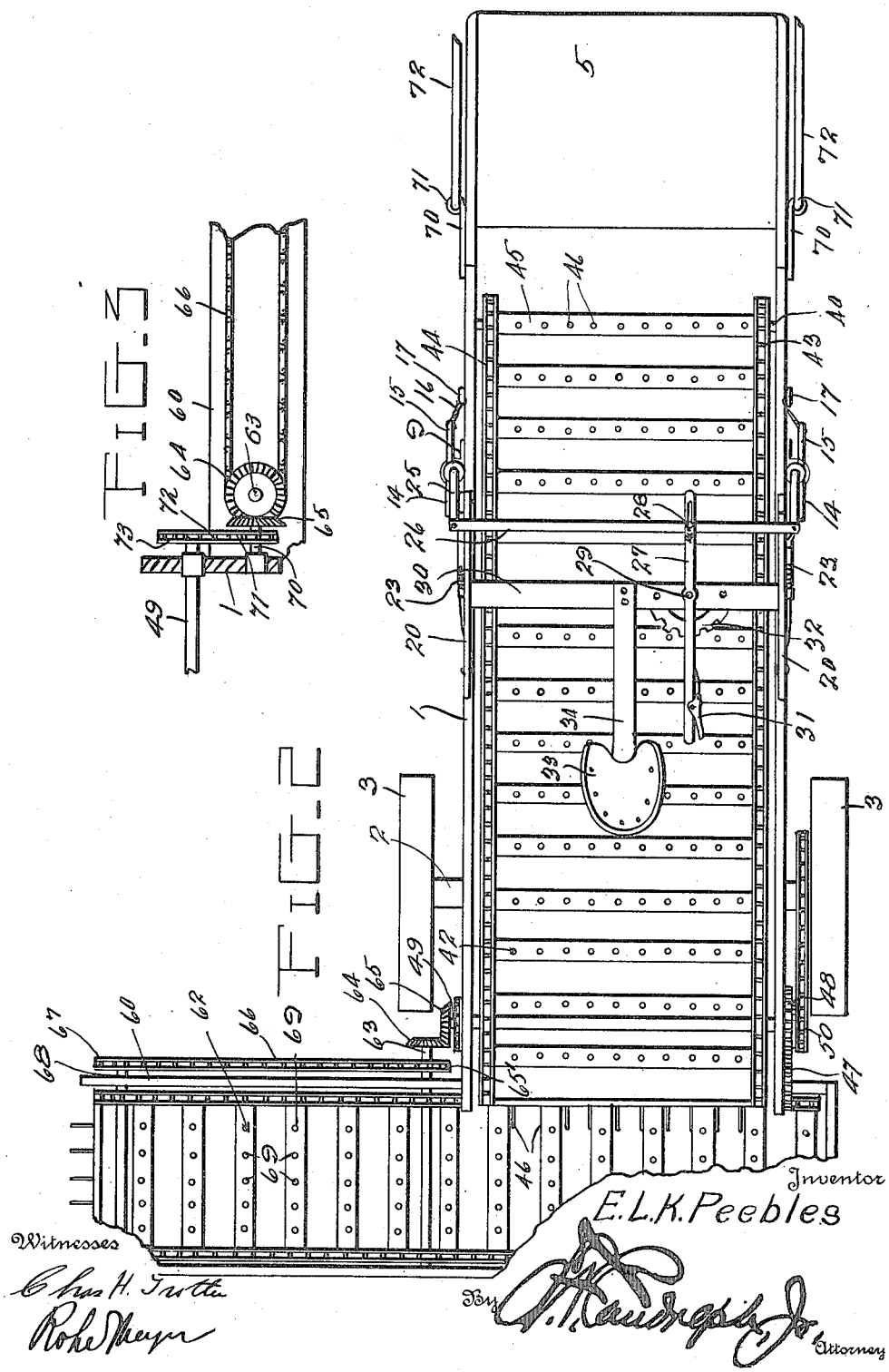

UNITED STATES PATENT OFFICE.

EDWIN L. K. PEEBLES, OF CLEVER, MISSOURI.

BEET-HARVESTER.

1,169,673.

Specification of Letters Patent.   Patented Jan. 25, 1916.

Application filed April 7, 1915.   Serial No. 19,735.

*To all whom it may concern:*

Be it known that I, EDWIN L. K. PEEBLES, a citizen of the United States, residing at Clever, in the county of Christian and State of Missouri, have invented certain new and useful Improvements in Beet-Harvesters; and I do hereby declare the following to be a full, clear, and exact description of the invention, such as will enable others skilled in the art to which it appertains to make and use the same.

This invention relates to beet harvesters, and the primary object of the invention is to provide a beet harvester which is comparatively simple in construction, and which will uproot the beets, and elevate them for deposit in a wagon bed, or other suitable receptacle.

Another object of this invention is to provide a beet harvester, which has a scoop or bit connected to the forward end thereof, for insertion into the ground for uprooting the beets, and suitable elevating or conveying means positioned rearwardly of the scoop, for receiving the beets therefrom and depositing them into a transversely extending conveyer for deposit in a wagon or other suitable receptacle.

A still further object of this invention is to provide means for raising or lowering the forward end of the body of the beet harvester, for regulating the depth of insertion of the bit or scoop into the ground, and also to provide means operatively connected to the front supporting wheels of the harvester for steering the wheels for properly guiding the harvester over a field.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved beet harvester, Fig. 2 is a top plan view of the beet harvester, and Fig. 3 is a fragmentary view of a part of the conveyer operating mechanism.

Referring more particularly to the drawings, 1 designates the body of the beet harvester, which has a rear axle 2 rotatably supported thereby, and upon which rear axle the body 1 is pivotally mounted. The rear axle 2 has the ordinary type of supporting traction wheels 3 mounted upon the spindle ends thereof. The forward ends of the sides of the body 1 have a scoop or bit 5 removably connected thereto, which scoop is provided for insertion into the ground, for uprooting a row of beets. The body 1 is positioned at an incline, as is clearly shown in Fig. 1, and the forward end of the same is supported by wheels 6 which are mounted upon the lower angled ends 7 of vertical rods 8. The rods 8 are slidably seated in guiding straps 9, which are secured to the outer surfaces of the sides of the body 1, and they project upwardly above the upper ends of the guiding straps, having their upper ends reduced, as is shown at 10.

The upper reduced ends 10 of the vertical rods 8 have collars 11 pivotally mounted thereon, as is shown at 12. The collars 11 have radially extending arms 14 and 15 formed thereupon, which extend in opposite directions from the collars and are positioned substantially in horizontal planes. The arms 15 have flexible members or rods 16 connected thereto, which are in turn connected to hooks 17. The hooks 17 are formed upon plates 18, which are secured to the sides of the body 1, forwardly of the guiding straps 9. The arms 14, which extend rearwardly of the vertical rods 10, have rods or flexible members 19 secured thereto, which are connected to levers 20. The levers 20 are pivotally connected to the upper ends of bars 21, which are secured to the sides of the body 1. The levers 20 extend rearwardly of the upper ends of the bars 21, substantially in a horizontal plane, and they have dog mechanisms 22 carried thereby, for coaction with quadrants 23. The quadrants 23 are formed or secured to bars 24. The bars 24 are secured to and project upwardly above the upper edges of the sides of the body 1.

The vertical rods 8 are also rotatably mounted within the straps 9, and they have their upper ends angled, as is shown at 25. The angled ends 25 of the vertical rods 8 have a cross bar 26 connecting them and extending transversely across the top of the body 1 of the beet harvester. A lever 27 is connected to the cross bar 26 by a slot and pin connection, shown at 28. The lever 27 is pivotally connected at 29 to a cross bar 30, and it has a dog mechanism 31 mounted thereon for coaction with a quadrant 32 for holding the lever in various adjusted pivotal positions. The lever 27 extends rearwardly, substantially in a horizontal plane, to a position for convenient access by an operator or person seated upon the seat 33. The seat 33 is supported by the usual type of resilient or spring standard 34, which has its lower end secured to the cross bar 30.

The body 1 has shafts 40 and 41 rotatably journaled transversely thereof, about which shafts a conveyer 42 travels. The conveyer 42 is composed of sprocket chains 43 and 44 which have flights 45 connected thereto at spaced intervals. The flights 45 have upstanding pins or tines 46 secured thereto for insuring the elevation of the beets by the travel of the conveyer. The shaft 41, which is positioned in the rear end of the body 1, and above the shaft 40, has a gear 47 mounted thereon which meshes with a gear 48. The gear 48 is mounted upon a shaft 49, which shaft also has a sprocket 50 mounted thereon. A sprocket chain 51 travels about the sprocket 50 and about a sprocket 52, which is secured to spokes of one of the rear supporting wheels 3.

The frame 1 has a transversely extending frame 60 secured to the rear ends thereof and supported by any suitable type of bracing or supporting means, as indicated at 61. The frame 60 has its forward edge positioned beneath the lower edge or bottom of the rear end of the body 1, so that the beets which are elevated by the conveyer 42, will be deposited upon the conveyer 62, which is carried by the auxiliary frame 60. The auxiliary frame 60 has a stub shaft 63 rotatably carried thereby, upon which is mounted a beveled gear 64. The beveled gear 64 meshes with a beveled gear 65, which is mounted upon a stub shaft 70. The stub shaft 70 has a sprocket 71 mounted thereon, which is operatively connected by means of a sprocket chain 72 to a sprocket 73, which is carried by the shaft 49. A sprocket 65′ is mounted upon the shaft 63 and has a sprocket chain 66 traveling thereabout. The sprocket chain 66 also travels about a sprocket 67 mounted on the shaft 68. The shaft 68 is rotatably carried by the outer end of the transversely extending auxiliary frame 60 and provides power for driving the conveyer 62.

The flights 45 of the conveyer 42, and the flights 69 of the conveyer 62, are spaced, so as to permit the dirt which is elevated by the scoop 5, to fall downwardly therebetween, during the elevation of the beets.

The body 1 has straps 70 secured to the forward end thereof, upon the outer ends of which are formed hooks 71. The hooks 71 are provided for connection with any suitable type of bail bars or members 72, by means of which any suitable type of draft power is hitched to the beet harvester.

By the operation of the lever 20, the scoop or bit 5 may be raised or lowered, for regulating the depth of insertion of the point of the same into the ground, and by adjustable movement of the lever 27, the beet harvester may be steered, for proper travel over fields.

The beets are uprooted by the scoop or bit 5, and they pass upwardly over the bottom of the scoop by the traction or forward movement of the beet harvester, until they reach the upper edge of the same, where they are engaged by the flights 45 of the conveyer 42, and moved upwardly through the body 1 of the beet harvester, and deposited upon the transversely extending conveyer 62. The transversely extending conveyer 62 carries the beets to one side of the harvester for deposit in a wagon, or any suitable type of receptacle, or for deposit in rows of piles upon the field. By spacing the flights of the conveyers, the dirt which is carried upwardly by the scoop, with the beets, is permitted to sift or fall through the conveyers upon the ground beneath the body 1.

From the foregoing description taken in connection with the accompanying drawings the advantages of construction and of the method of operation of the improved beet harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a beet harvester structure, a body, a scoop removably secured to the forward end of said body, a plurality of guiding straps secured to the sides of said body at the forward end thereof, vertical standards rotatably and slidably carried by said guiding straps, collars mounted upon the upper ends of said standards, arms projecting radially from said collars, the forwardly extending arms being connected to said body, levers connected to the rearwardly extending arms for moving said body vertically with respect to said wheels, the upper ends of said vertical rods being angled, a cross bar connecting said angled ends, a lever connected to said cross bar for horizontal oscillatory movement for rotating said standards for positioning said wheels for guiding the travel of the beet harvester, and a conveyer carried by said body for elevating beets therethrough.

2. In a beet harvester structure, a body, a scoop removably secured to the forward end of said body, a plurality of guiding straps secured to the sides of said body at the forward end thereof, vertical standards rotatably and slidably carried by said guiding straps, collars mounted upon the upper ends of said standards, arms projecting radially from said collars, the forwardly extending arms being connected to said body, levers connected to the rearwardly extending arms for moving said body vertically with respect to said wheels, the upper ends of said vertical rods being angled, a cross bar connecting said angled ends, a lever connected to said cross bar for horizontal oscillatory movement for rotating said standards for positioning said wheels for guiding the travel of the beet harvester, and a conveyer carried by said body for elevating beets therethrough, a transversely extending auxiliary body secured to the rear end of said body and having its upper edge positioned beneath the bottom of the rear end of said body, a conveyer mounted within said auxiliary body for travel transversely to the direction of travel of the beet harvester, and means for operating said conveyers by the travel of the beet harvester.

In testimony whereof I affix my signature in presence of two witnesses.

EDWIN L. K. PEEBLES.

Witnesses:
G. H. DAVIS,
J. L. SOLOMON.

Copies of this patent may be obtained for five cents each, by addressing the "Commissioner of Patents, Washington, D. C."